(12) United States Patent
Regaard

(10) Patent No.: US 10,399,185 B2
(45) Date of Patent: Sep. 3, 2019

(54) DETERMINING A FOCUS POSITION OF A HIGH-ENERGY BEAM

(71) Applicant: TRUMPF Werkzeugmaschinen GmbH + Co. KG, Ditzingen (DE)

(72) Inventor: Boris Regaard, Gerlingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 699 days.

(21) Appl. No.: 14/952,184

(22) Filed: Nov. 25, 2015

(65) Prior Publication Data

US 2016/0114434 A1    Apr. 28, 2016

Related U.S. Application Data

(63) Continuation of application No. PCT/EP2013/069029, filed on Sep. 13, 2013.

(30) Foreign Application Priority Data

May 29, 2013  (DE) .......... 10 2013 210 078

(51) Int. Cl.
  *B23K 26/04*  (2014.01)
  *B23K 26/70*  (2014.01)
  (Continued)

(52) U.S. Cl.
  CPC .......... *B23K 26/707* (2015.10); *B23K 26/046* (2013.01); *B23K 26/0617* (2013.01); *B23K 26/0648* (2013.01)

(58) Field of Classification Search
  CPC .......... B23K 9/04; B23K 9/0956; B23K 9/32; B23K 26/02; B23K 26/032; B23K 26/0876; B23K 26/0344; B23K 26/046
  (Continued)

(56) References Cited

U.S. PATENT DOCUMENTS 4,383,168 A    5/1983  Luck
5,673,101 A *  9/1997  Tenner ................ G03F 7/70675
                                                         355/401

(Continued)

FOREIGN PATENT DOCUMENTS

CN    202240152 U    5/2012
CN    102974936 A    3/2013
(Continued)

OTHER PUBLICATIONS

Notification Concerning Transmittal of International Preliminary Report on Patentability from corresponding PCT Application No. PCT/EP2013/069029, dated Dec. 10, 2015, 17 pages.

*Primary Examiner* — Brian W Jennison
(74) *Attorney, Agent, or Firm* — Fish & Richardson P.C.

(57) ABSTRACT

An apparatus includes a focusing element arranged to focus a high-energy beam on a workpiece, an image detector for recording at least one image of an area to be monitored on the surface of the workpiece and/or the reference contour; imaging optics arranged to (a) receive process radiation radiation through the focusing element, from an area of the workpiece and/or the reference contour to be monitored, in the form of a first monitoring beam that is non-coaxial with the high-energy beam between the workpiece and the imaging optics and (b) redirect the first monitoring beam to the image detector to provide the at least one image of the area to be monitored and/or the reference contour; and an evaluation device operable to determine the focus position of the high-energy beam based on the at least one recorded image.

26 Claims, 4 Drawing Sheets

(51) Int. Cl.
*B23K 26/046* (2014.01)
*B23K 26/06* (2014.01)

(58) Field of Classification Search
USPC ..................................... 219/121.85
See application file for complete search history.

(56) References Cited

U.S. PATENT DOCUMENTS

| | | | |
|---|---|---|---|
| 2008/0058734 A1 | 3/2008 | Hanft et al. | |
| 2008/0246973 A1* | 10/2008 | Regaard | B23K 26/04 356/615 |
| 2010/0326962 A1 | 12/2010 | Calla et al. | |
| 2011/0001858 A1 | 1/2011 | Shintani et al. | |
| 2013/0319980 A1* | 12/2013 | Hesse | B23K 26/032 219/121.62 |

FOREIGN PATENT DOCUMENTS

| | | |
|---|---|---|
| DE | 19914984 A1 | 10/2000 |
| DE | 10157895 A1 | 7/2003 |
| DE | 102005032946 A1 | 2/2006 |
| DE | 102010017316 A1 | 12/2010 |
| DE | 102011016519 A1 | 10/2012 |
| EP | 2065117 A1 | 6/2009 |
| EP | 2456592 B1 | 4/2013 |
| JP | H0943507 A | 2/1997 |
| JP | H1020182 A | 1/1998 |
| JP | 2010052014 A | 3/2010 |
| JP | 2012146702 A | 8/2012 |
| JP | 2012151597 A | 8/2012 |
| JP | 2012533434 A | 12/2012 |
| WO | WO2009104390 A1 | 8/2009 |
| WO | WO2009113701 A1 | 9/2009 |
| WO | WO2011009594 A1 | 1/2011 |
| WO | WO2012101533 A1 | 8/2012 |

* cited by examiner

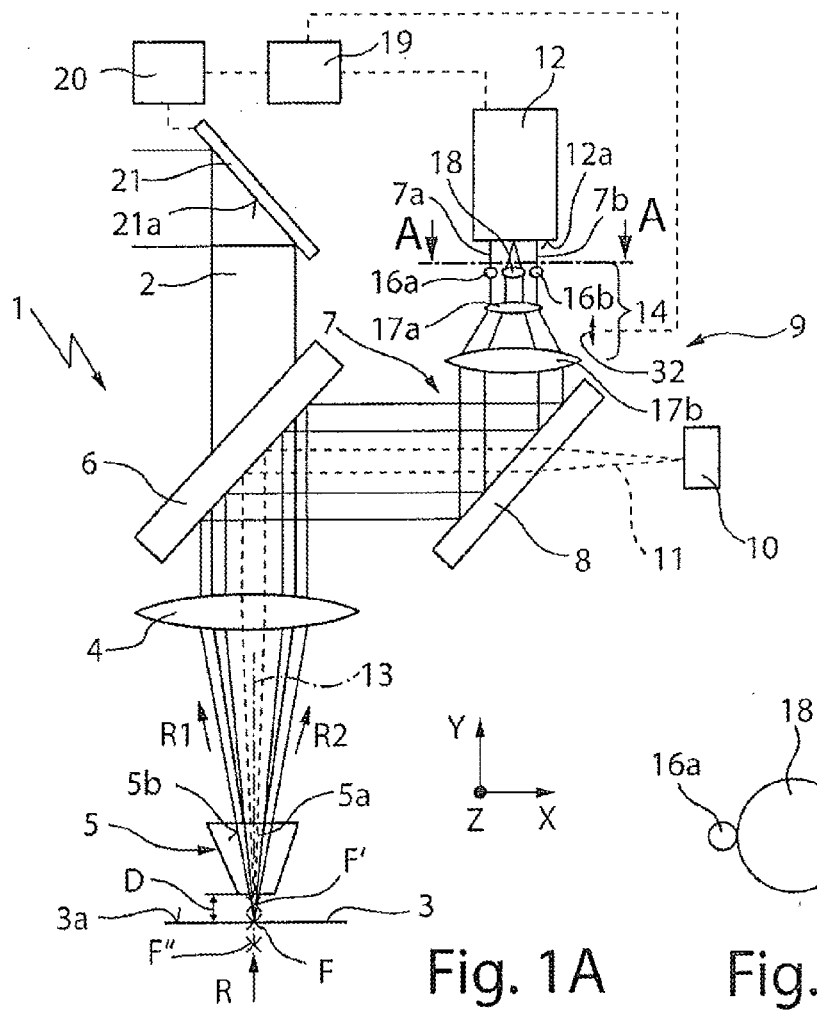
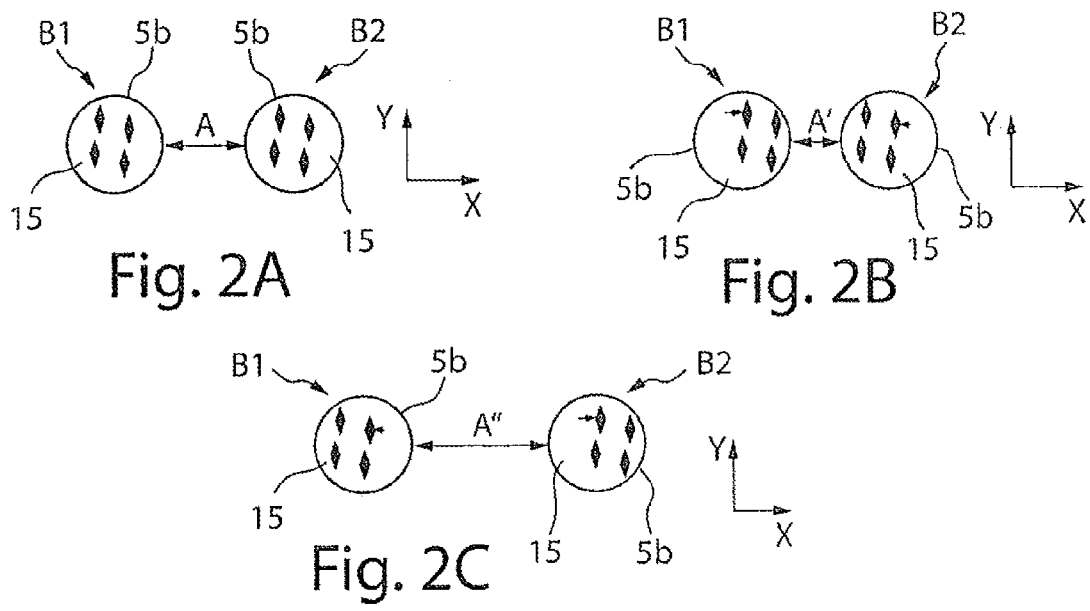

DETERMINING A FOCUS POSITION OF A HIGH-ENERGY BEAM

CROSS-REFERENCE TO RELATED APPLICATIONS

This application is a continuation of and claims priority under 35 U.S.C. § 120 to PCT Application No. PCT/EP2013/069029 filed on Sep. 13, 2013, which claimed priority to German Application No. DE 10 2013 210 078, filed on May 29, 2013. The contents of both of these priority applications are hereby incorporated by reference in their entirety.

TECHNICAL FIELD

The present disclosure relates to determining a focus position of a high-energy beam.

BACKGROUND

The focus position or the position of the focus plane is an important parameter for a high-energy beam used in workpiece processing. The location of the focus plane or the location of the focus position in the expansion direction of the high-energy beam depends on the divergence or the convergence of the high-energy beam in front of the focusing element as well as on the focal length of the focusing element for the high-energy radiation (or more precisely, for the wavelength range of the high-energy radiation, or the working wavelength if using a laser beam) used.

The divergence or convergence of the high-energy beam can normally be controlled well and is subject to little change following a basic adjustment. For great beam power, however, and in particular for $CO_2$ laser radiation, the focal length of the focusing element may change during workpiece processing. For example, if a lens is used as the focusing element, a radial temperature gradient will form due to the inhomogeneous warming and cooling of the lens, which will lead to a change in the refractive index n of the lens, since n is dependent on the radial coordinate (i.e., n=n(r)). The refractive index change during workpiece processing can lead to a shortening of the focal length (so-called thermal lens). The actual focal length $f_{FL}$ of the focusing lens is therefore, among other things, a function of the beam power $P_L$ and the beam shape (for example the beam diameter $D_R$), the degree of soiling of the focusing lens and the time t: $f_L=f(P_L, D_R, t)$.

Using a suitable measuring device, measurement of the beam path or of the beam caustics or recording the beam power in the vicinity of the beam waist can be performed to determine the focus position of a high-energy beam in the beam direction. It is also possible to cut the workpiece at several different selected distances between the focusing element and the workpiece, and to determine the focus position based on the width of the cut to the workpiece. The foregoing options do not typically allow recording the focus position during processing of the workpiece.

SUMMARY

The present disclosure relates to determining a focus position of a high-energy beam, such as a laser beam during workpiece processing. The focus position can be determined along a beam direction of the high-energy beam relative to a workpiece and/or relative to a reference contour of a device that determines the focus position. The device can include a focusing element for focusing the high-energy beam on the workpiece. The device can be, for example, a processing head, such as a laser processing head.

In general, in some aspects, the subject matter of the present disclosure can be embodied in apparatuses that include: a focusing element to focus the high-energy beam on the workpiece; an image recording device to record an area to be monitored on the surface of the workpiece and/or a reference contour by a monitoring beam path extending through the focusing element, in which the image recording device is designed for forming at least one monitoring beam associated with a monitoring direction extending non-coaxially or non-parallel to the beam direction of the high-energy beam; and imaging optics for generating at least one image of the area to be monitored and/or of the reference contour from the at least one monitoring direction, as well as an evaluation device designed or programmed for determining the focus position of the high-energy beam by evaluating the at least one image recorded.

The measuring principle for determining the focus position in the beam direction of the high-energy beam is based on recording at least one image of the area to be monitored or of the reference contour from at least one viewing angle, from at least one monitoring direction that is not coaxial with the high-energy beam. That is, the part of the monitoring beam that has passed through the focusing element extends at an angle to the optical axis of the focusing element. With such a monitoring beam, changes to the focal length of the focusing element, or possibly the object distance, i.e., the distance between the workpiece and the focusing element can be recognized, the focus position in the beam direction of the laser beam can be determined, and corrected if necessary following suitable evaluation of the recorded image.

In some implementations, the evaluation device is configured to determine the focus position along the direction of propagation of the high-energy beam based on the position of the reference contour in the at least one recorded image. In this case, a reference contour statically positioned relative to the device, or a reference geometry (for example, which is formed in a laser processing head by an inner nozzle contour of a laser processing nozzle), can be used to determine the focus position. The reference contour can have a constant distance along the beam direction from the focusing element which may include, for example, a focusing lens. A change in the focal length of the focusing element, for example, due to a thermal load, leads to a lateral displacement of the reference geometry on the recorded image. The focus position can be determined by the size of the lateral displacement of the position of the reference geometry on the image recorded. The direction of the lateral displacement of the focus position from a target focus position can also be concluded from the direction of the lateral displacement. The deviation or the lateral offset from a reference position of the reference contour can, for example, be determined for a focusing element not subject to thermal loads for this purpose. The reference position at the (known) focal length of the focusing element in the cold condition, i.e., without applying a high-energy beam, can be determined prior to evaluating the image and stored in a storage facility associated with the evaluation device, in the form of a reference image or a position of, e.g., a center of an area, the geometric center or a specific geometric characteristic, for example a geometric edge.

In some implementations, the image recording device is configured to form at least one additional monitoring beam portion, associated with an additional monitoring direction, in which the imaging optics are arranged to generate at least two images of the area to be monitored and/or of the reference contour from the at least two different monitoring directions, and in which the evaluation device is designed for determining the focus position of the high-energy beam based on a comparative evaluation of the images recorded.

The measuring principle for determining the focus position is based on a stereoscopic distance measurement through the focusing element, i.e., by recording of two or more images of the area to be monitored on the surface of the workpiece, or of the reference contour mounted in the device, from two or more different monitoring directions or viewing angles. The imaging optics form two or more monitoring beam portions extending through the focusing element off-center (i.e., not through the central axis) that each extend at a different angle from the workpiece, toward areas which are spaced apart from each other on one or more detector surfaces. As an alternative to generating two or more images in areas of the detector surface(s) spaced apart from each other, two or more images can also be recorded in the same area of a detector surface, one shortly after another, as described in more detail below. The comparative evaluation of three or more images makes it possible to increase the accuracy of the determined focus position.

It is advantageous if the viewing angles or monitoring directions at which the images are recorded are as different as possible from each other to improve the precision with which the focus position is determined. A large difference between the viewing angles can be realized when the two images of the surface area of the workpiece to be monitored pass through two diametrically opposing edge areas of the focus element. One or more focusing lenses or a focusing mirror, such as an off-axis parabolic mirror, can serve as the focusing element.

If the workpiece is located in the focal plane of the focusing lens, the pictures or images of the area of the workpiece to be monitored from the edge area of the focusing lens coincide. The two images of the area on the surface of the workpiece to be monitored are however laterally offset from each other when the workpiece is located outside of, e.g., above or below, the focal plane of the focusing lens. It is possible to determine the deviation or the distance of the focus position or the focus plane from the workpiece from the size of the lateral displacement between the two images.

Accordingly, it is also possible to determine the focus position relative to the apparatus or to the reference contour or reference geometry from the lateral distance between two images of the reference contour formed in the device. To achieve this, the distance between the two images of the reference contour at the (known) focal length of the focusing element in a cold condition, e.g., without applying a high-energy beam, is obtained. The change in distance between the two images resulting from the change in focal length then can be associated with a corresponding change in the focus position. In this way a focal length measurement of the focusing element or a determination of the focus position relative to the apparatus, and thus independent from the workpiece, is possible.

To determine the lateral deviation between the images and the position of maximum consistency, a correlation between the position of the two images can be applied, for example, using a block matching algorithm or a local frequency analysis. Contrary to the measurement of image sharpness described in WO 2011/009594 A1, the stereoscopic measurement allows an absolute value and direction of the focal length deviation (e.g., directed towards the workpiece or away from the same) to be determined. In this way a rapid feedback control of the focus position is possible without having to depend on iterative tracking. The influence of additional optical elements located in the imaging beam path on the change in focal length or on the change in the focus position should also be taken into consideration with the stereoscopic imaging. For example, this applies to a thermal lens produced by a protection glass, which forms the end of the apparatus in the form of a processing head, in the direction of the workpiece.

In some implementations, the apparatus includes a light source to illuminate the surface of the workpiece, such as the area and/or the reference contour to be monitored. The light source can, for example, produce light at wavelengths of between 360 nm and 800 nm (VIS) or approx. 800 nm and approx. 1000 nm (NIR). This illumination can be used to obtain an image of contours on the surface of the workpiece in the area to be monitored or the reference contour formed on the apparatus. The illumination can be coaxial to the high-energy beam, e.g., in the form of an incident illumination. It is also possible to use the light source to illuminate a defined measuring position inside the apparatus, where the reference contour or reference geometry is formed. The reference contour can, for example, be irradiated by a directional light source and recorded by the image recognition device. A cutting nozzle affixed to the cutting head for guiding a process gas can also be used as a reference contour.

In some implementations, the monitoring or imaging beam path of the image recording device for recording the area on the surface of the workpiece to be monitored includes an image recording area that is delimited by the reference contour. In this case, the light source can, for example, illuminate the workpiece or another surface below the reference contour. The reference contour, or the reference geometry, delimits the illumination or delimits the image recording area covered by the image recording device.

In some implementations, the evaluation device is configured to determine the focus position of the high-energy beam relative to the workpiece by comparing the images of the (e.g., rough) surface of the workpiece in the area to be monitored. In this case, since the surface of the usually plate-shaped workpiece is not completely smooth but (at least in microscopic magnitudes) has a roughness, and therefore has a location-dependent varying surface structure, the surface structures can be used for the comparative evaluation or correlation of the two images. For example, the focus position can be determined based on a lateral distance between the surface structures in the images recorded from different monitoring directions.

The area of the workpiece to be monitored usually includes an interaction area of the high-energy beam with the workpiece. Alternatively, or in addition to the stereoscopic correlation of the images of the contours of the rough workpiece surface, process-specific lighting (thermal radiation, plasma radiation) can also be used for the stereoscopic evaluation of the two images. In both cases, structured illumination can be used to illuminate the workpiece, for example in the form of a focused illumination beam in the vicinity of the interaction area.

In some implementations, the imaging optics include at least two imaging optical elements, each associated with a respective monitoring direction. Imaging optical elements can, for example, include lens elements. The lens elements can be arranged at a distance from each other that approximately equals the distance between the two images on the detector surface. Each of the two imaging optical elements produces its own imaging or monitoring beam portion for generating the respective associated image in the associated area of the detector surface. The two lens elements can be off-center, e.g., they are not arranged coaxially to the beam path of the high-energy beam or its extension into the monitoring beam path. In this way, two or more beam bundles can be imaged, each of which runs through an edge area of the focusing lens and therefore enables monitoring from two or more different monitoring angles or monitoring directions. Spherical or aspherical lenses can, for example, be used as imaging optical elements. One of the imaging optical elements can be arranged coaxially to the beam path of the high-energy beam.

In some implementations, the imaging optical elements are designed as cylinder lenses. The imaging optical elements can include a first cylinder lens to generate a deflection imaging effect along a first axis. The imaging optics can include at least a second cylinder lens to produce an imaging effect along a second axis that is orthogonal to the first. With these crossed cylinder lenses, the imaging optics can be produced cost effectively on the one hand, while the available imaging cross-section can be well utilized on the other hand.

In some implementations, the imaging optical elements are arranged in a lens array or in a grid arrangement. A grid arrangement of lens elements (e.g., a "lenslet" or lens array), such as microlenses, which can also be arranged in the form of two crossed cylinder lens arrays, can be used to spatially resolve wave front aberrations caused by the thermal load on the lens element. Beam focusing of the processing beam can be optimized with beam shaping focusing elements having located before the focusing element. In addition, or alternatively, coaxial monitoring of the workpiece can be improved for process monitoring purposes, using, e.g., another wavelength, with a suitable correction of the monitoring beam path. The beam shape of the processing beam can be corrected and the workpiece can be monitored, for example, by adjusting aperture diameters, with a change of the distance of lenses along the beam path, using, e.g., deformable mirrors. The measuring principle for determining the wave front aberration represents a variation of the Shack-Hartmann sensor, in which a local wave front gradient is measured in the focal plane of the lens array through a displacement of focus points generated by the lenses of a two-dimensional lens array.

In some implementations, the imaging optics include a deflection component with at least two beam deflection areas each associated with a respective monitoring direction. The deflection component can serve as a geometric beam divider. Incoming radiation can, for example, be diverted to different areas of an imaging optical element, such as a lens element. Two beam bundles deflected by the deflection component and incident upon areas of the lens element that diametrically oppose each other are focused onto different areas, arranged at a distance from each other, by the lens element in its focal plane, where the images of the area to be monitored or the reference contour are produced.

In some implementations, the deflection component includes at least one deflection prism. One or more beam deflection areas can include, for example, facets or surface areas of the prism that are aligned at an angle to the beam axis. The deflection prism can include a central area that is designed as a plano-parallel plate on which no deflection occurs. The beam deflection areas or beam deflection surfaces can be arranged around the central area, so that an approximately concave or convex geometry of the deflection prism is provided. As an alternative to using a deflection prism, the deflection component can include multiple beam deflection areas in the form of mirrored surfaces, which deflect the monitoring beams in different directions associated with a respective monitoring direction.

In some implementations, the image recording device includes a beam offsetting component to form the at least two monitoring beams, each of which is associated with a monitoring direction. The beam offsetting component can be arranged in the focused illumination beam path of the imaging optics, such as, for example between two optical elements forming a beam telescope. The beam offsetting component can, for example, include two or more blocks of a material that are transparent to the illumination radiation. For example, the material can include quartz glass as planoparallel blocks or plates for producing a parallel offset of incoming monitoring radiation. The blocks can be tilted towards each other to ensure that the two or more monitoring beams incident on different areas of the detector surface to produce two or more laterally offset images.

The image recording device can include a beam divider to form the at least two monitoring beam portions associated with a respective monitoring direction. The beam divider can divide the monitoring radiation into two or more monitoring beam portions with the aid of at least one characteristic that changes across the beam cross-section. This characteristic can, for example, be the polarization direction, the power, or the wavelength of the monitoring radiation that varies across the cross-section of the monitoring beam path. A separate imaging optical element can be provided for imaging a respective monitoring beam portion on a detector surface. It is also possible to image the monitoring beam portions by a common imaging optics in the form of, for example, a common focusing lens.

In some implementations, the image recording device is configured to produce the at least two monitoring beam portions associated with a respective monitoring direction at different times. In these implementations, the two or more images are recorded with a time offset (e.g., a short time offset, such as in the range of a few microseconds or milliseconds) that depends on the image capture rate of the detector or the camera of the image recording device. The two or more images can be generated in one and the same location on a detector surface. That is, a spatial separation of the monitoring beams on the detector surface is not necessary in these implementations. The monitoring beam path is partially shaded for time sequential recordings of these images, such that a different part of the monitoring beam path is shaded for each recording of an image.

In some implementations, the image recording device includes at least one aperture to form the at least two monitoring beam portions, in which each monitoring beam portion is associated with a respective monitoring direction. The aperture can be configured or controlled to form the two or more monitoring beams at different times. The aperture can be, for example, a displaceable, rotatable or switchable aperture. The aperture can partially shade the monitoring beam path, in which different parts of the monitoring beam path can be shaded at different sequential times through suitable control of the aperture. An aperture opening, through which the monitoring radiation passes, produces a monitoring beam portion that is associated with a monitoring direction. The aperture can be an electronic shutter (for example, an LCD monitor with switchable pixels) or a mechanical shutter (for example, a pinhole aperture) that can be moved in the image plane (for example, rotated within the image plane or displaced within the image plane) and can cover or open different areas of the monitoring beam path at different sequential times to generate two or more images from different monitoring directions. Additional areas of the aperture of the monitoring beam path can be opened or closed for the high-resolution monitoring of the area of the workpiece to be monitored, with the aim of process monitoring.

In some implementations, the imaging optics are configured to produce at least three images of the area to be monitored and/or of the reference contour from different monitoring directions. As explained above, the focus position can be determined based on the lateral offset along one direction between two images recorded from different monitoring directions. The use of three or more images can, however, sometimes increase the statistical significance of the comparison or the accuracy with which the focus position is determined. At least one additional image (e.g., a third, fourth, or more) can also be used to obtain information about the focusing element, such as the wave front aberration, as explained herein. A change of the focal length of a focusing element, such as a focusing lens, irradiated with high laser power can be determined in a location-dependent way, e.g., the change may be dependent on the radial position relative to the optical axis of the focusing element. Three or more images of the workpiece surface and/or the reference contour can be produced and imaged on a detector, for example, a camera, with more than two imaging optical elements (for example, in the form of a lens array) or with more than two beam deflection areas.

In some implementations, the apparatus includes at least one imaging optical element for producing an image of the area on the surface of the workpiece to be monitored from a monitoring direction that is coaxial to the high-energy beam. As explained herein, the area to be monitored can include an interaction area between the high-energy beam and the workpiece. Self-illumination of the workpiece processing can be detected with the imaging optical element in the visible (VIS) range and/or a heat image of the area to be monitored can be created in the near-infrared (NIR)/infrared (IR) range to obtain information about the workpiece processing, which can include, for example a welding or a cutting process. This monitoring of the workpiece processing, also known as process monitoring, can be carried out in addition to the stereoscopic capturing of the area or the reference contour to be monitored.

The imaging optical element can be a lens element that has a larger diameter than the lens elements associated with the respective monitoring directions for obtaining higher resolution when imaging. The imaging optical element may also be used to produce two or more images taken from different monitoring directions, which do not extend coaxially to or parallel with the propagation direction of the high-energy beam. This includes, e.g., the case when the imaging optics include a deflection prism as described herein.

In some implementations, the evaluation device is designed for the comparative evaluation of the image taken coaxially to the high-energy beam and at least one image not taken coaxially to the high-energy beam. The focus position of the high-energy beam can also be determined in the way described above by means of the comparative evaluation of an image taken coaxially and at least one image not taken coaxially to the high-energy beam.

In some implementations, the image recording device is configured to record the at least one image through a nozzle opening of a laser processing nozzle that allows a laser beam to pass onto the workpiece. With this so-called coaxial monitoring, images of the area of the workpiece to be monitored are recorded through the processing nozzle (for example, a laser cutting nozzle) as well as through the focusing element by one or by more cameras. The device can be a laser processing head in this case.

In some implementations, the inner nozzle contour of the laser processing nozzle, such as a laser cutting nozzle, forms the reference contour or reference geometry that is used for a stereoscopic image evaluation. The lateral distance between two images of the inner nozzle contour can, for example, be determined in order to obtain a rough adjustment of the focus position. In certain implementations, since the comparative evaluation of images of the inner contour of the nozzle opening can be carried out quickly, only the distance between the two delimitations of the image of the workpiece taken through the nozzle opening needs to be determined. The determination of a lateral offset between the images of the workpiece surface, where the contours or the surface geometry of the workpiece are evaluated, may require more calculation time and can be used for a precise adjustment of the focus position.

In some implementations, the image recording device includes at least one detector, in particular a camera, with a detector surface, on which the at least one image is created. The same detector surface, for example in the form of a CCD chip or a CMOS chip of the camera, can be used to record several images, in which the images are created in different part areas of the detector surface. In this case, it is advantageous, if the imaging optics include a beam telescope for adjusting the imaging cross-section to the available detector surface. Two or more cameras can also be provided in the image recording device for recording one or more images on the respective detector surface. For example, the position of the reference contour can be determined using a simpler optical sensor or detector, such as a four-quadrant diode or a line camera, instead of an area scan camera.

In some implementations, the evaluation device is configured to determine a distance between the reference contour and the upper side of the workpiece based on a comparison of the recorded images. The distance between the reference contour and the workpiece can be determined by comparing the distance of a surface structure on the upper side of the workpiece, e.g., an image position on the workpiece surface, with a (corresponding) position of the reference contour in the two images recorded.

In some implementations, the apparatus additionally includes a means for changing the focus position of the high-energy beam along the beam direction as well as a controller and/or regulator unit for controlling and/or applying feedback control to the focus position of the high-energy beam to a target focus position relative to the workpiece. The means for changing the focus position can, for example, be a so-called adaptive mirror, the surface curvature of which can be influenced in a targeted way for changing the focus position in the beam direction of the high-energy beam. The means can be controlled with the aid of the actual focus position determined as described herein in that the focus position is adjusted, using feedback control, to a target focus position that can remain constant during the processing process, and that can, for example, be located on the upper side of the workpiece or at a pre-determined distance from the workpiece. As a result, the focal length changes of the focusing element, which are due to a thermal load on the focusing element, can be compensated. If the means for changing the focus position, i.e., the adjusting element, is located before the measuring position or before the monitoring beam, the focus position can be adjusted to the target focus position. Once the focus position on the workpiece has been determined and the focus distance of the reference contour in the processing head (for example, in the laser cutting nozzle) is known, the distance of the reference contour from the workpiece surface can be calculated and controlled or regulated by the controller and/or regulator unit.

In some implementations, the apparatus also includes a means for changing the focus position of the imaging optics along the beam direction of the high-energy beam, as well as a control and/or regulation unit for controlling and/or adjusting, based on feedback control, the focus position of the imaging optics to a target focus position. The means for changing the focus position or the adjusting element can be located in the monitoring beam path, so that the focus position of the imaging optics can be regulated with feedback control to the target focus position. The target focus position of the imaging optics can lie on the surface of the workpiece to be monitored. Regulating, using feedback control, to the target focus position can be carried out according to the method described above in connection with the high-energy beam.

In general, in another aspect, the subject matter of the present disclosure encompasses methods of the type mentioned above, and additional methods, which include: recording an area to be monitored on the surface of the workpiece and/or the reference contour by a monitoring beam passing through the focusing element; generating at least one image of the area to be monitored and/or of the reference contour by forming at least one monitoring beam portion that is associated with a monitoring direction that is not coaxial with the high-energy beam, as well as determining the focus position in the beam direction of the high-energy beam by evaluating the at least one recorded image.

In some implementations of the methods, the focus position in the beam direction of the high-energy beam is determined with the aid of a position of the reference contour in the at least one recorded image. The focus position can be determined in this case by a lateral displacement of the reference contour within the recorded image, for example, through comparison with a reference position.

In some implementations, at least one additional monitoring beam portion associated with an additional monitoring direction is formed for generating at least two images of the area and/or the reference contour to be monitored from at least two different monitoring directions, in which the focus position of the high-energy beam is determined through comparative evaluation of the recorded images. A lateral offset between the two recoded images or the structures visible on the same can be determined based on a comparative evaluation of the two images, in which the lateral offset represents a measure of the location of the focus position relative to the reference contour or relative to the workpiece.

In another aspect, the subject matter of the present disclosure can be embodied in a computer program product that includes computer executable code that, when executed by a data processing system, causes the data processing system to carry out one or more steps of the method described herein. The data processing system can, for example, include a controller and regulator device and/or an evaluation device housed in a device as described above, but also can be external means that forms part of a processing machine.

Further advantages will be apparent from the description and the drawing. The above mentioned as well as additional characteristics yet to be illustrated can be used, each on their own or several together in any combination and should not be understood as an exclusive list, but rather as being of an exemplary nature.

BRIEF DESCRIPTION OF THE DRAWINGS

FIG. 1A is a schematic illustrating an example of a device for determining a focus position of a laser beam.

FIG. 1B is a plan view of imaging optics of the device of FIG. 1A.

FIGS. 2A, 2B and 2C are schematics illustrating two images of an area of a workpiece to be monitored taken from different monitoring directions with different focus positions of a laser beam.

DETAILED DESCRIPTION

Figure 3:
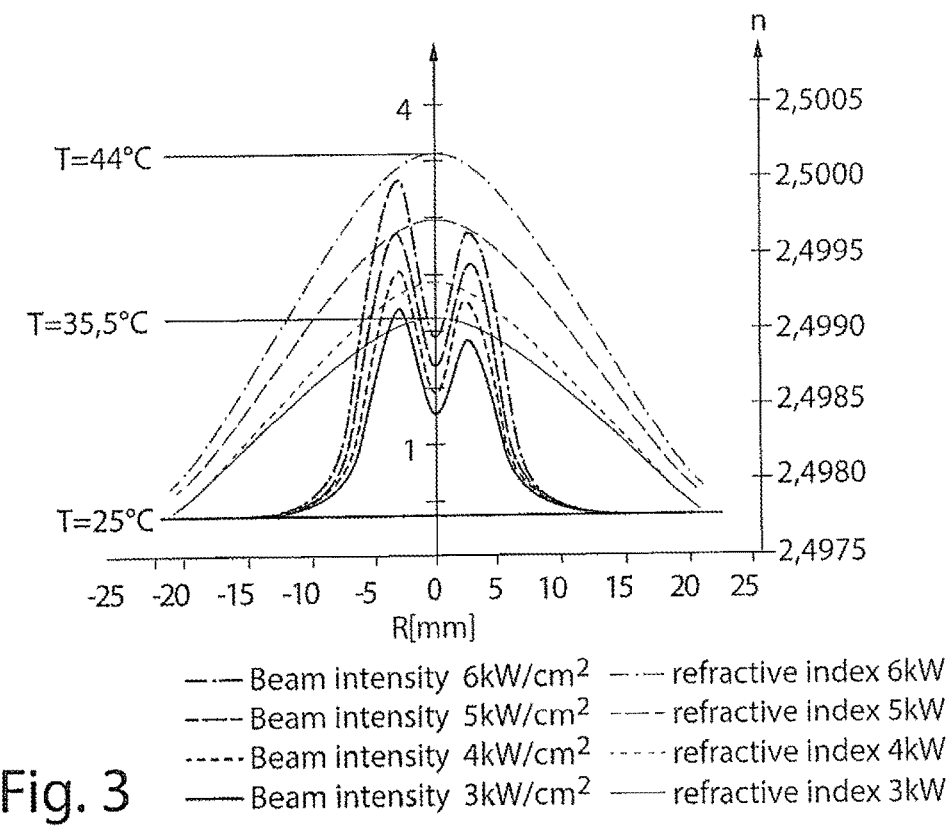
FIG. 3 is a schematic illustrating a radial beam profile impinging onto a focusing lens and a radial refractive index distribution of the focusing lens resulting from the same.

FIG. 1A is a schematic that illustrates an exemplary construction of an apparatus 1 for focusing a laser beam 2 on a workpiece 3 in the form of a laser processing head, which is part of a laser processing machine not shown in detail. The laser beam 2 is generated by a $CO_2$ laser in the example shown. Alternatively, the laser beam 2 can, for example, be generated by a solid-state laser. The laser beam 2 is focused on the workpiece 3 by a focusing element in the form of a focusing lens 4 to carry out workpiece processing on the workpiece 3. Workpiece processing can include, for example, a laser welding or laser cutting process. In the example shown in FIG. 1A, the focusing lens 4 is a lens made of zinc selenide. The lens 4 focuses the laser beam 2 through a laser processing nozzle 5, or more precisely through its nozzle opening 5a, onto the workpiece 3 at a focus position F on the upper side 3a of the workpiece 3. In implementations in which the laser beam 2 is provided by a solid-state laser, the focusing lens can be made, for example, from quartz glass.

A partially transmissive deflection mirror 6 is also shown in FIG. 1A. The partially transmissive deflection mirror 6 transmits the incoming laser beam 2 (having a wavelength of, e.g., approximately 10 μm). The partially transmissive deflection mirror 6 also deflects monitoring radiation 7 relevant for process monitoring (for example, in the visible wavelength range) to a further partially transmissive deflection mirror 8. In implementations in which the laser beam 2 is provided by a solid-state laser, the deflection mirror 6 can be designed to be partially transmissive for a wavelength of approximately 1 μm. The partially transmissive deflection mirror 8 reflects the monitoring radiation 7 to an image recording device 9. A light source 10 coaxially illuminates the workpiece 3 with illumination radiation 11. The illumination radiation 11 is transmitted by the partially transmissive deflection mirror 8 and guided through the nozzle opening 5a of the laser processing nozzle 5 onto the workpiece 3. Alternatively, in some implementations, the partially transmissive deflection mirrors 6, 8 are replaced by scraper mirrors or aperture mirrors, which reflect incoming radiation only from an edge area, to redirect the monitoring radiation 7 to the image recording device 9 and/or to supply the illumination radiation 11 to the workpiece 3. In some implementations, two mirrors affixed to the sides of the beam path of the laser beam 2 can also be used for enabling monitoring.

Diode lasers or LEDs can be provided as a light source 10 and can be arranged coaxially with the laser beam axis 13 of laser beam 2 as shown in FIG. 1A, or off-axis from the laser beam axis 13. In some implementations, the light source 10 is arranged outside (e.g., next to) the device 1 and is directed onto the workpiece 3. Alternatively, in some implementations, the light source 10 is arranged inside the device 1, but not aligned on the workpiece 3 coaxially to the laser beam 2. The device 1 may also be operated without a light source 10.

A geometrical high-resolution camera 12 is arranged in the illumination radiation path 7 behind the partially transmissive deflection mirror 8 as part of the image recording device 9. The camera 12 can be a high-speed camera arranged coaxial to the laser beam axis 13 of the laser beam 2 reflected from the mirror 8 or to the extension of the laser beam axis 13, and thus direction-independently. In the example shown, the images are recorded by the camera 12 within the visible wavelength range, although it is also possible that the camera 12 records images within the near infrared (NIR)/infrared (IR) wavelength range for the process-specific lighting or a heat image of the processing. Image recording within the UV range is also possible for recording incident light or process (e.g., plasma) radiation. In the example shown in FIG. 1A, a filter can be arranged in front of the camera 12 if further radiation or wavelength parts are to be excluded from being recorded by the camera 12. The filter can, for example, be formed as a narrow-band band-pass filter.

The image recording device 9 includes imaging optics 14 for generating images B1, B2 of an area 15 of workpiece surface 3a to be monitored (shown in FIGS. 2A-C) on a detector surface 12a of the camera 12. The imaging optics 14 include two lens elements 16a, 16b arranged in the beam path of the monitoring beam 7 in the example shown. The lens elements 16a, 16b are arranged in a common plane and image just one part beam or one part bundle of the monitoring beam 7 each, to form a monitoring beam 7a, 7b on different areas of the detector surface 12a of the camera 12. As a result, two images B1, B2 distanced from each other, as shown in FIGS. 2A-2C, are generated on the detector surface. As shown in FIGS. 2A-C, the relevant area imaged by the lens elements 16a, 16b, or the images B1, B2 of the workpiece 3, is delimited by a circular inner contour 5b of the laser processing nozzle 5. The imaging optics 14 include a beam telescope with two additional lenses 17a, 17b for adjusting the image cross-section to the size of the detector surface 12a.

Parts of the monitoring beam 7 (monitoring beam 7a, 7b) imaged by the two lenses 16a, 16b onto the detector surface 12a originate from two edge areas of the focusing lens 4 diametrically opposing each other in the direction X of an XYZ coordinate system. The monitoring beams 7a, 7b thus image the area 15 of the workpiece 3 to be monitored as well as the inner contour 5b of the laser processing nozzle 5 from different monitoring directions R1, R2, or from different monitoring angles relative to the laser beam axis 13. The two lenses 16a, 16b enable a stereoscopic monitoring of the area 15 to be monitored or the inner contour 5b of the laser processing nozzle 5.

The imaging optics 14 include an additional lens 18 in FIG. 1A, which images monitoring radiation from a central area of the focusing lens 4 that intersects the laser beam axis 13 on the detector surface 12a of the camera 12. As shown in FIG. 1B, the additional lens 18 has a larger diameter than the two lenses 16a, 16b used for the stereoscopic monitoring. The additional lens 18 serves for process monitoring, or more precisely for the monitoring of an interaction region between the laser beam 2 and the workpiece 3 within the monitored area 15. Thanks to the comparatively large diameter of the additional lens 18 a comparatively large image comprising a high number of pixels is generated on the detector surface 12a, which improves the resolution during process monitoring. The additional lens 18, and therefore process monitoring, can also be omitted unlike shown in FIG. 1A. In this case the distance in the X direction between the two lenses 16a, 16b can be shortened compared to the illustration in FIG. 1A, B.

In the following, it will be illustrated with reference to FIGS. 2A-C how the focus positions F, F', and F" of the laser beam 2 can be determined relative to the workpiece 3 in an evaluation device 19 by comparative evaluation of the two recorded images B1, B2.

In the illustration of the two images B1, B2 generated by the lenses 16a, 16b shown in FIG. 2A, the focus position F of the laser beam 2 is located on the upper side of the workpiece 3, which equals a target focus position of workpiece processing in this example. The two images B1, B2 each correspond to a section of the surface 3a of the plate-shaped workpiece 3 equaling the area 15 to be monitored. The images B1, B2 have a roughness, and thus a surface structure, that is indicated by example in FIG. 2A. As shown in FIG. 2A, the two images B1, B2 of surface 3a (or the structures on the surface of workpiece 3) recorded through the nozzle opening are identical. In particular, there is no lateral offset in the X direction in the area 15 to be monitored that is delimited by an inner contour 5b of the laser processing nozzle 5 forming a reference contour. The two images B1, B2 are offset by a distance in the X direction, which correlates with the distance between the two lenses 16a, 16b on the detector surface 12a.

In FIG. 2B, the focus position F' of the laser beam 2 is located above the upper side 3a of the workpiece 3. As shown in FIG. 2B, the area 15 of the workpiece 3 to be monitored and imaged in images B1, B2 is not identical, as the surface structures that can be seen in the images B1, B2 are laterally offset from each other here, namely to the right with the first image B1, i.e., in a positive X direction, whilst the surface structure depicted in the second image B2 is offset to the left, i.e., in the negative X direction, as indicated by a respective arrow. The amount of the lateral offset between the surface structures of the workpiece 3 imaged to the two images B1, B2 depends on the distance of the focus position F' from the workpiece 3, in which the lateral offset increases as the distance between the focus position F' and the workpiece 3 increases, so that this offset represents a measure of the deviation of the focus position F' from the target focus position F on the upper side 3a of the workpiece 3. As is also shown in FIG. 2B, the distance A' between the two images B1, B2 delimited by the inner contour 5b of the laser processing nozzle 5 decreases on the detector surface 12a with the focus position F' shown above the workpiece 3. Whether the distance A or A' between the two images B1, B2 increases or decreases when the focus position F' is shifted in the direction towards the laser processing head 1 will depend on the imaging principle used for generating the images B1, B2.

In the illustration of the two images B1, B2 in FIG. 2C, the focus position F" of the laser beam 2 is located below the workpiece 3. As shown in FIG. 2C, the surface structures of the workpiece 3 visible in images B1, B2 are laterally offset from each other, namely to the left, i.e., in the negative X direction in the first image B1, while the imaged surface structures in the second image B2 are offset to the right, i.e., in the positive X direction, as indicated by a respective arrow. The amount of the lateral offset between the surface structures of the workpiece 3 imaged to the two images B1, B2 delimited by the inner contour 5b is a measure of the deviation of the focus position F" from the target focus position F on the upper side 3a of the workpiece 3. As is also shown in FIG. 2C, the distance A" between the two images B1, B2, delimited by the inner contour 5b of the laser processing nozzle 5, also increases on the detector surface 12a.

As can be seen from a comparison of FIG. 2B with FIG. 2C, the direction of the lateral offset of the two images B1, B2 depends on whether the focus position is located above or below the workpiece 3. Thus, the focus position relative to the workpiece 3 can be determined not only as an absolute value, but also in its direction with the aid of a comparative evaluation of the two images B1, B2, in which the lateral offset is, for example, determined with the aid of block matching algorithm or by frequency analysis. The same applies for distance A, A', or A" between the two images B1, B2 on the detector surface 12a, which also represents a measure for focus position F, F', or F" relative to the reference contour formed by the inner nozzle contour 5b.

Deviations of the focus position from the target focus position F on the upper side 3a of the workpiece 3 can occur unintentionally during workpiece processing, as the refractive index of the focusing lens 4 is temperature dependent. As shown in FIG. 3, the refractive index n of the focusing lens 5 is illustrated for different radiation powers of the incoming laser beam 2. The beam intensity (in kW/cm') that impinges on the focusing lens 4 is also shown in FIG. 3 as a function of location or the radius coordinate, in which the beam intensity increases with increasing radiation power (in kW). As the thermal load or the temperature of the focusing lens 4 cannot be predicted, or at least not predicted with adequate precision during the workpiece processing for adjusting the focus position to the target focus position F, the method described above for determining the focus position is advantageous for applying feedback control to the target focus position F to a desired (e.g., constant) value during the processing process.

The laser processing head includes a controller or regulator unit 20 for adjusting the focus position F, F', or F" to the target focus position, with which the evaluation device 19 electrically communicates. The controller/regulator unit 20 controls or regulates, using feedback control, the entire laser processing process and acts upon a further adaptive deflection mirror 21 arranged in the beam path of the laser beam 2 in the present case, or more precisely on the optical surface 21a of the same, whose curvature can be altered. The curvature of the adaptive deflection mirror 21 influences the focus position F, F', or F" in the beam expansion direction 13 of the laser beam 2. The curvature can be set using the controller/regulator unit 20 in such a way that the thermally dependent deviation of the focus position from the target focus position F', F" is compensated. In the example described here this means that the curvature of the adaptive deflection mirror 21 is altered until the situation shown in FIG. 2A occurs, i.e., until the structures identified in the two images B1, B2 are not at a lateral distance from each other anymore.

It is understood that target focus position F does not necessarily have to lie on the upper side 3a of the workpiece 3, and that the target focus position F can instead be located at a distance from the upper side of workpiece 3. In this case as well, the controller/regulator unit 20 can be used to regulate, with feedback control, a pre-determined lateral distance, which equals the desired target focus position, between the structures that can be seen in the two images B1, B2. In addition or alternatively, the regulation of the focus position F, F', or F" can also be realized by altering the distance A, A', or A", between the two images B1, B2. That is, the distance A, A', or A" can be regulated to a desired distance A, which equals a target focus position or a target focal length of the focusing lens 4 relative to the laser processing head 1. In particular, a rough adjustment of the focus position F, F', or F" can be realized by altering the distance A, A', or A". The Distance D between the laser processing nozzle 5 and the workpiece 3, or the upper side 3a of the workpiece 3, can also be determined by comparing the distance between A, A', or A" and the lateral offset between the surface structures that can be seen in the two images B1, B2. Specifically, the distance D is determined by obtaining the difference between the distances of the same surface structure in both images B1, B2 and the edge of the respective image B1, B2 formed by the reference contour 5b (in direction X). This difference is assigned to the distance D to the workpiece 3 by a known functional relationship, which is calculated or determined by test measurements. Other characteristics of the workpiece 3 can also be used instead of measuring the lateral offset between the surface structures visible in images B1, B2, in order to determine the lateral offset. For example, images of the process-specific lighting (such as heat images) or the like can also be used by the evaluation device 19.

The controller/regulator unit 20 can also be used to regulate, using feedback control, the focus position of the imaging optics 14. For this purpose, the controller/regulator unit 20 acts on a component 32 that displaces the lenses 17a, 17b in a beam direction 13 of the laser beam 2. Or, more precisely, the component 32 can change the relative distance between the lenses 17a, 17b. The focus position of the imaging optics 14 is described with the same reference numbers F, F', F' as the focus position of the laser beam 2 for simplicity. By regulating, with feedback control, the focus position F, F', or F" of the imaging optics 19, it can be ensured that the surface 3a of the workpiece 3 is arranged in its depth of focus range, so that the surface 3a of the workpiece 3 is imaged sharply on the detector surface 12a. The distance A, A', or A" between the two images B1, B2 is adjusted to a target distance determined by test measurements or calculated for adjusting the focus position F, F', or F" to the target focus position on the workpiece 3.

Figures 4A, 4B, 4C:
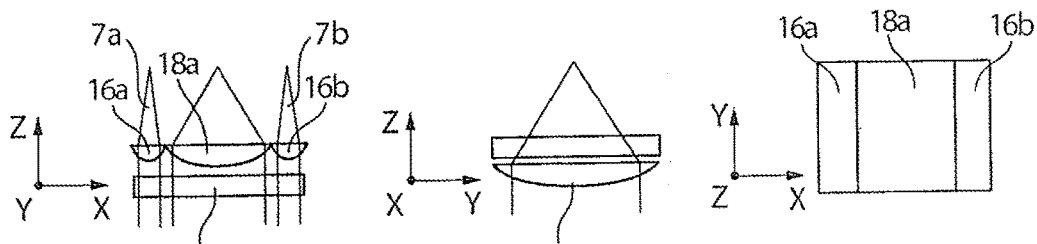
FIGS. 4A, 4B and 4C are schematics illustrating examples of imaging optics for the device of FIGS. 1A and 1B.

As shown in FIGS. 4A-C, cylinder lenses 16a, 16b, with an imaging effect in direction X but not in direction Y, can also be used as the imaging optics 14 in place of spherical lenses, which are associated with a respective monitoring direction R1, R2. The additional center lens is also designed as a cylinder lens 18a, which generates an optical effect only in direction X. A cylinder lens 18b aligned in direction Y serves to generate an image, also in direction Y. Due to the crossed cylinder lenses 16a, 16b, 18a or 18b, the available imaging cross-section can be used on the detector surface 12a.

Figures 5A, 5B, 5C:
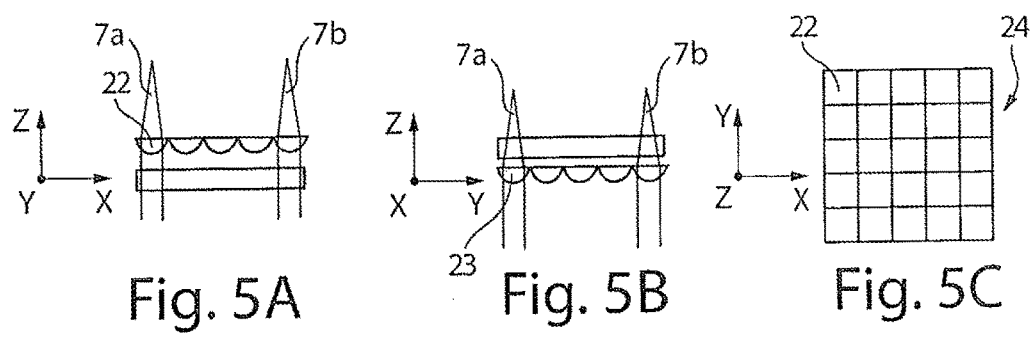
FIGS. 5A, 5B and 5C are schematics illustrating examples of imaging optics for the device of FIGS. 1A and 1B.

The imaging optics 14 shown in FIGS. 5A-C also include multiple crossed first and second cylinder lenses 22, 23, arranged in a grid arrangement 24 to generate a number of 5×5=25 images on the detector surface 12a. The grid arrangement 24 of lens elements 22, 23 can be used to determine spatially resolved wave front aberrations, which are caused by the thermal load on the focusing lens 4. With the aid of these wave front aberrations, beam focusing can be optimized using beam shaping optical elements located before the focusing lens 4. Alternatively or in addition, the wave front aberrations can be used to correct and improve coaxial monitoring of the workpiece 3. The path of the monitoring beam 7 can, for example, be modified by adjusting apertures and/or distances between imaging optical elements and/or by freely adjustable mirrors.

Figure 6A:
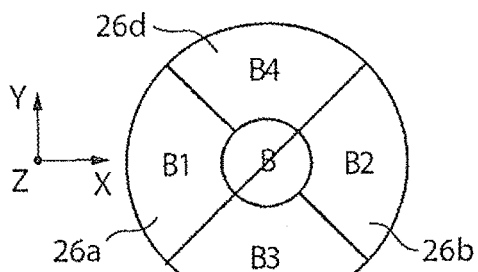
FIGS. 6A and 6B are schematics illustrating examples of imaging optics for the device of FIGS. 1A and 1B.
Figure 6B:
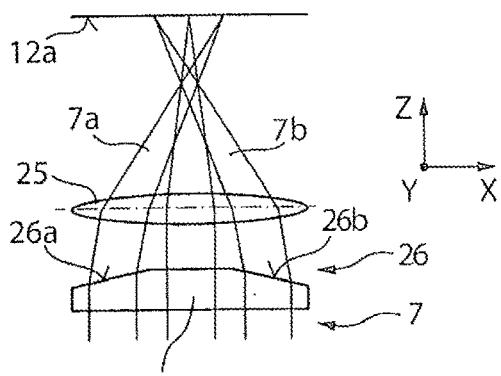

An alternative design of the imaging optics 14 is shown in FIGS. 6A-B and includes an imaging lens 25 and a beam deflection device in the form of a deflection prism 26. The deflection prism 26 includes four wedge-shaped sections with planar surfaces 26a-d arranged at an angle from the monitoring radiation or the beam axis of the same, and also arranged around a central planar area 27. The first two surfaces 26a, b serve as beam deflection areas for deflecting incoming monitoring beams in the X direction, so that these do not impact vertically on the central plane of the imaging lens 25, and generate a first and second image B1, B2 on the detector surface 12a, located at a distance from each other along the X axis.

The third surface 26c and the fourth surface 26d serve as beam deflection areas for generating a third and fourth image B3, B4, respectively, on the detector surface 12a, located at a distance from each other along the Y direction. The central area 27 that does not deflect the monitoring radiation directs light on the detector surface 12a to form an image B, centrally arranged in the beam path of the monitoring radiation, which can be used for process monitoring as described above. The generation of four images B1, B2 or B3, B4, which are each compared with each other in pairs, provides further information about the focusing lens 4, such as an indication regarding wave front aberrations or different thermal loads in the two directions (X or Y). A comparative evaluation of three or of all four images B1, B2 or B3, B4 can also be carried out in the evaluation device 19, for increasing the significance of the correlation, and therefore the precision of the determination of focus position F, F', F'''.

Figure 7A:
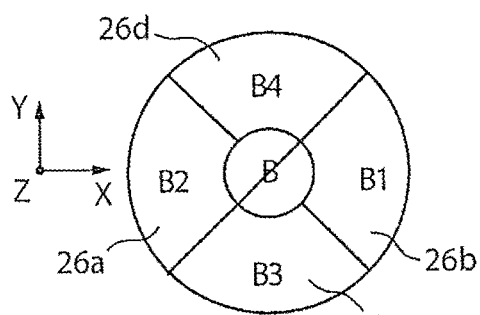
FIGS. 7A and 7B are schematics illustrating examples of imaging optics for the device of FIGS. 1A and 1B.

In the embodiment shown in FIGS. 6A, B, an approximately convex geometry of the deflection prism results overall. The deflection prism 26 shown in FIGS. 7A, B differs from that shown in FIGS. 6A, B in that the prism 26 in FIGS. 7A, B has a substantially concave geometry, which reverses the allocation of images B1, B2 to beams 7a, 7b of the monitoring beam 7 and equals the allocation shown in FIG. 1. The allocation of part beams or of beam bundles of the monitoring beam 7 to images B1, B2 or B3, B4 must be taken into consideration when identifying the direction of the change of the focus position F, or F', F''' (toward the workpiece 3 or away from the same).

Figure 8A:
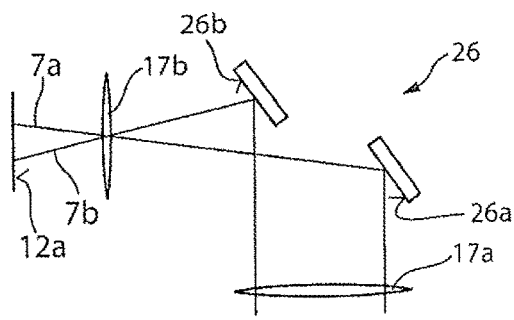
FIG. 8A is a schematic illustrating examples of imaging optics for the device of FIGS. 1A and 1B.

A further embodiment of imaging optics with a beam deflection component 26 that includes two mirrors having beam deflection areas in the form of planar mirror surfaces 26a, 26b is illustrated in FIG. 8A. Since the two mirror surfaces 26a, 26b are tilted towards each other, incoming monitoring radiation 7 is reflected in different directions and hits different points on the detector surface 12a in the form of two monitoring beams 7a, 7b associated with a respective monitoring direction R1, R2 for generating a first and second image B1, B2.

Figure 8B:
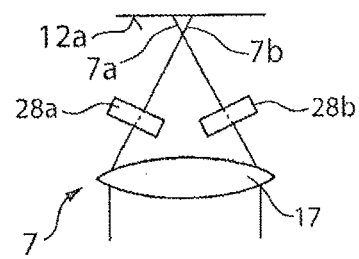
FIG. 8B is a schematic illustrating examples of imaging optics for the device of FIGS. 1A and 1B.

Another embodiment for generating two (or more) images B1, B2 is illustrated in FIG. 8b. Two blocks 28a, 28b (plane-parallel plates) made of quartz glass are arranged in an area of the focused monitoring beam 7 behind a lens 17. The blocks 28a, 28b include two parallel face sides and serve as beam offsetting means. The focused monitoring radiation in each case impacts at an angle onto the beam entry side of the respective block 28a, 28b and exits at the opposite beam outlet side under the same angle but at a parallel offset. Due to the greater refractive index in the optically denser medium of the blocks 28a, 28b the monitoring beams extend at a smaller angle to the normal direction, vertical to the incoming or exit surface in the quartz glass material. The part of the monitoring radiation entering a respective block 28a, 28b forms a monitoring beam 7a, 7b associated with a respective monitoring direction R1, R2, such that, due to the beam offset, the two monitoring beams 7a, 7b strike the detector surface 12a with a lateral offset to generate two images B1, B2 laterally offset from each other there.

Figure 7B:
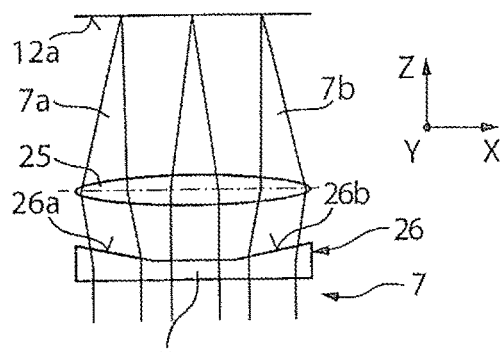

In the example shown in FIG. 8B the monitoring beams 7a, 7b cross one another, since, as in the example shown in FIG. 6B, the surface normal directions (vertical to the beam entry or beam exit surface) of the blocks 28a, 28b are tilted towards and cross one another behind the blocks 28a, 28b. The monitoring beams 7a, 7b can also propagate as shown in FIG. 7B if the blocks 28a, 28b are tilted towards each other in the opposite direction, i.e., if the directions of the surface normals intersect in the beam path in front of the lens 17.

The focus position F, F', F''' of the laser beam 2 can be determined based on a comparison of the two images as described above using the evaluation device 19. One or more apertures, such as fixed apertures, can also be provided in the beam path of the monitoring radiation 7 in the examples described herein, for masking parts of the monitoring radiation 7 that are not supposed to reach the detector surface 12a or are not needed for forming the two monitoring beams 7a, 7b.

In a variant not pictured here a beam divider can be used for forming two monitoring beams 7a, 7b associated with a monitoring direction R1, R2 each, which divides the monitoring beam 7 into two (or more) parts forming the monitoring beams 7a, 7b by at least one characteristic that changes across the beam cross-section. The beam divider can, for example, be configured to transmit or reflect a beam part of the monitoring beam path 7 depending on the wavelength, polarization or power of the monitoring radiation. A monitoring beam 7b with high power originating from the center of the monitoring beam 7 can, for example, be transmitted by the beam divider, and a monitoring beam 7a with a lower power originating from the edge area of the monitoring beam 7 can be reflected.

Figure 9A:
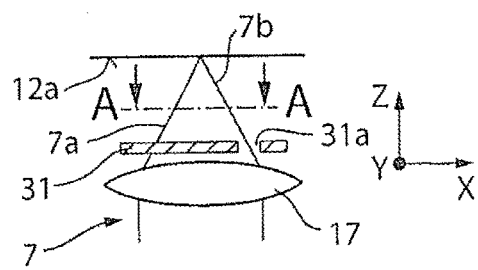
FIGS. 9A and 9B are side view and plan view illustrations, respectively, of an example of imaging optics for the device of FIGS. 1A and 1B.
Figure 9B:
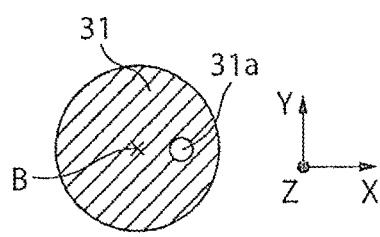

FIGS. 9A, B are schematics that illustrate another embodiment for forming two monitoring beams 7a, 7b associated with one of the two monitoring directions R1, R2, which differs from the embodiments described above in that the monitoring beams 7a, 7b are formed in a temporal sequence. As shown in FIGS. 9A, B, an aperture 31 is provided in the imaging optics 14 for this purpose. The aperture 31 is rotatably mounted around a central rotation axis B, so that the position of an eccentrically arranged aperture opening 31a moves around rotation axis B along an arc when rotating. A corresponding part of the monitoring beam 7 passing through the aperture opening 31a forms a monitoring beam 7a, 7b. By arranging the aperture 31 in the beam path of the imaging optics 14, which include a focusing lens 17, the monitoring beams 7a, 7b are sequentially imaged at the same point on the detector surface 12a, but are derived from different portions of the monitoring beam 7 that can be, for example, diametrically opposite to one another. The images recorded in sequence by the camera 12 then can be comparatively evaluated by the evaluation device 19 as described herein to determine the focus position F, F', F" of the laser beam 2.

In some implementations, an electrically adjustable aperture, for example, in the form of an LCD array, in which individual pixels or pixel groups are switched on or off electronically for generating the aperture effect, can be used in place of a mechanically adjustable aperture 31. The mechanical aperture 31 can also be moved or displaced transverse to the monitoring beam 7 in the XY-plane to shade or open different parts of the monitoring beam 7 for monitoring in a temporal sequence. In some implementations, the aperture 31 can include one or more elements that are to be closed or opened, and/or includes several apertures that can be arranged one behind the other for realizing the temporally sequenced generation of images.

Figure 10:
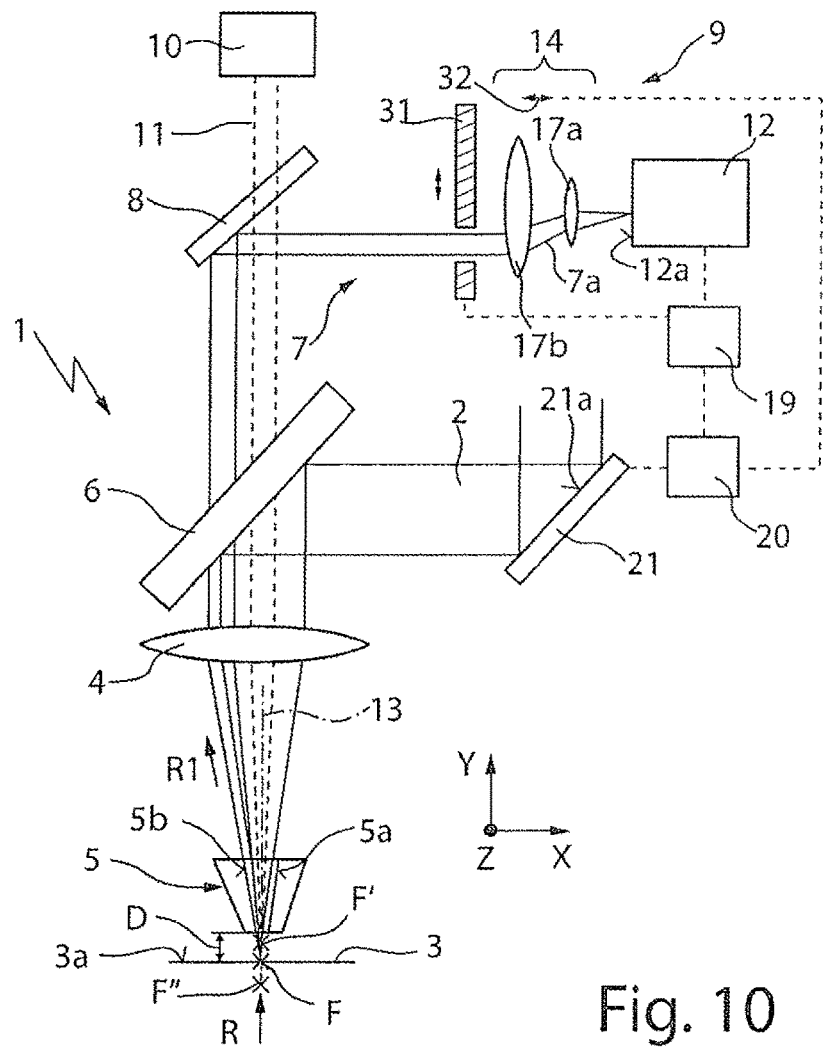
FIG. 10 is a schematic illustrating an example of a device for determining a focus position of a laser beam.

FIG. 10 is a schematic that illustrates another embodiment of an apparatus 1 in the form of a laser processing head for focusing a laser beam 2 on a workpiece 3. The apparatus 1 shown in FIG. 10 differs from the apparatus 1 shown in FIG. 1 in that a single image B1 of the area 15 or of the inner contour 5b of the laser processing nozzle 5 forming the reference contour is monitored and recorded. For this purpose a single monitoring beam 7a is formed by the image recording device 9 with the aid of an aperture 31, which generates the image B1 on the detector surface 12a as well as a possible additional, higher resolution image from a monitoring direction R coaxial to the high-energy beam 2 by the imaging optics 14, which include two lenses 17a, 17b in a telescope arrangement for adjusting the beam cross-section of the monitoring beam 7a on the detector surface 12a of the camera, similar to that as described above with reference to FIG. 1.

Figure 11A:
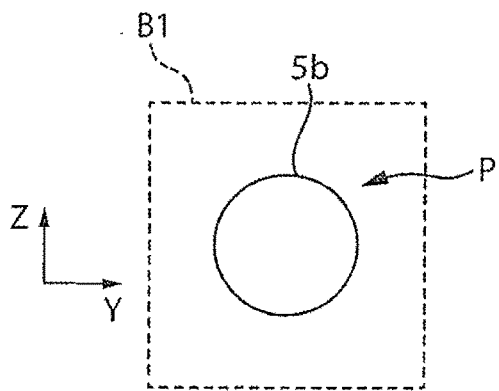
FIGS. 11A and 11B are schematics illustrating examples of images of a reference contour for different focusing positions of a laser beam.

As shown in FIGS. 11A, B, the positions P, P' of the inner contour 5b of the laser processing nozzle 5 forming the reference contour change within the image B1 or on the detector surface 12a when the focus positions F, F' are changed.

Figure 11B:
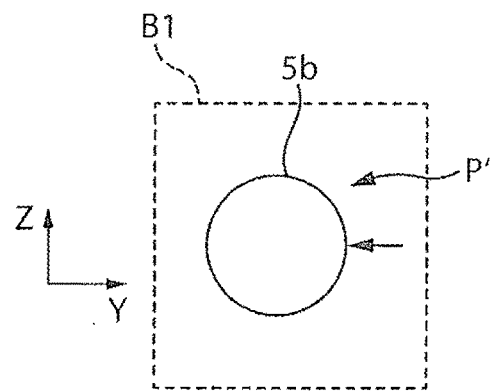

In the illustration shown in FIG. 11A, the focus position F of the laser beam 2 is located on the upper side 3a of the workpiece 3, which corresponds to the target focus position. In the illustration shown in FIG. 11B, the focus position F of the laser beam 2 is located above the upper side 3a of the workpiece 3 and the position P' of the inner contour 5b is lateral (in the negative direction Y) offset compared to the position P shown in FIG. 11A. The absolute value of the lateral offset between the positions P, P' on the recorded image B1 depends on the distance of the focus position F' from the workpiece 3. The lateral offset increases with increasing distance between the focus position F' and the workpiece 3, so that this offset represents a measure of the deviation of the focus position F' from the target focus position F on the upper side 3a of the workpiece 3. The lateral offset can be, for example, determined based on a correlation of the recorded image B1 with a reference image recorded with the desired target focus position F. Alternatively, the lateral offset can be determined by identifying a characteristic position, for example the geometric center or a specific geometric characteristic such as an object edge, on the recorded image B1 and on the reference image. The deviation between the characteristic positions in the two images can be determined based on a comparison of the images and corresponds to the lateral offset.

Whether a shift of the focus position F' in the direction towards the laser processing head 1 results in an offset of the inner contour 5b of the laser processing nozzle 5 in the recorded image B1 in the positive or in the negative Y direction depends on the imaging principle used for generating the image B1. The association between the lateral offset direction of the inner contour 5b and the displacement direction of the focus position F is unambiguous for a given imaging principle, so that the direction of displacement of the focus position F can be determined from the lateral offset direction.

As indicated in FIG. 10, the aperture 31 can be displaced and can be in electrical communication with the evaluation device 19 and/or with the controller/regulator unit 20 for controlling the displacement. The part of the focusing lens 4 through which the monitoring beam 7a passes can be set by the displacement of the aperture 31, such that the monitoring direction R1 or the monitoring angle can be changed.

In the device shown in FIG. 10 an additional optical element, that alters a shape of the beam or adjusts a focus of the beam, such as an adaptive deflection mirror 21 (or more precisely the optical surface 21a of the adaptive deflection mirror 21), can be arranged in the beam path of the laser beam 2. The adaptive deflection mirror 21 can also be modified with the aid of the controller/regulator unit 20 for regulating, with feedback control, the focus position F or F' in the beam expansion direction 13 of the laser beam 2 to a target focus position. Other optical elements that allow modification of a beam or adjustment of focus are also possible. Examples of such other optical elements include a lens with variable focal length (for example, a liquid lens) or a lens that can be displaced in a position in the beam path. A displacement of focus position F, F', F" of the laser beam 2, which can be corrected by control within the laser beam 2, can be inferred based on the lateral offset of the inner contour 5b or based on the amount of displacement of the lens 17a or the lens 17b necessary to correct or regulate the focus position of the imaging optics 14.

The controller/regulator unit 20 is also operable to regulate, with feedback control, the focus position of the imaging optics 14 since the controller/regulator unit 20 controls the displacement means 32 that displaces the lenses 17a, 17b in the beam direction 13 of the laser beam 2 as described above in connection with FIG. 1. As a result, the surface 3a of the workpiece 3 can be imaged sharply on the detector surface 12a.

Generally, the focus position F, F', or F" of the laser beam 2 can be determined, and corrected as described herein during workpiece processing. If the target focus position F is located on upper side 3a of the workpiece 3, the focus position of the workpiece 3 can be adjusted so that it is located in the focal plane of the focusing lens 4. Apart from the improvement in process quality, regulation, with feedback control, of the focus position of the imaging optics 14 can improve process monitoring since it can, in certain implementations, provide a sharper image of the surface of the workpiece 3.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for determining a focus position of a high-energy beam along a propagating direction of the high-energy beam relative to a workpiece or relative to a reference contour of the apparatus, comprising:
a focusing lens arranged to focus the high-energy beam on the workpiece;
an image detector for recording at least one image of an area to be monitored on the surface of the workpiece, of the reference contour, or of both the workpiece and the reference contour;
imaging optics comprising at least one additional lens, the imaging optics being arranged to (a) receive monitoring radiation that is emitted from or reflected from the workpiece and passes through the focusing lens from the area to be monitored, (b) derive a first monitoring beam from a first outer portion of the monitoring radiation that is non-coaxial with and excludes a center portion of the monitoring radiation, and (c) redirect the first monitoring beam to the image detector to provide the at least one image of the area to be monitored; and
a programmable evaluation device operable to determine the focus position of the high-energy beam based on the at least one recorded image.

2. The apparatus according to claim 1, wherein the programmable evaluation device is operable to determine the focus position of the high-energy beam based on a position of the reference contour in the at least one recorded image.

3. An apparatus according to claim 1, wherein the imaging optics are arranged to (d) derive at least one additional monitoring beam from a third portion of the monitoring radiation, and (e) redirect the first monitoring beam and the at least one additional monitoring beam to the image detector to provide at least two images of the area to be monitored, and wherein
the programmable evaluation device is operable to determine the focus position of the high-energy beam based on a comparison of the at least two recorded images.

4. The apparatus according to claim 1, further comprising a light source operable to illuminate an upper side of the workpiece in the area to be monitored.

5. The apparatus according to claim 1, wherein the area to be monitored is delimited by the reference contour.

6. The apparatus according to claim 3, wherein the programmable evaluation device is operable to determine the focus position relative to the workpiece.

7. The apparatus according to claim 3, wherein the imaging optics comprise at least two imaging optical elements, each imaging optical element being arranged to derive a corresponding monitoring beam from the monitoring radiation.

8. The apparatus according to claim 7, wherein the imaging optical elements comprise cylinder lenses.

9. The apparatus according to claim 7, wherein the imaging optical elements are arranged in a lens array.

10. The imaging apparatus according to claim 3, wherein the imaging optics comprise a deflector with at least two beam deflection areas, each beam deflection area being arranged to derive a corresponding monitoring beam from the monitoring radiation.

11. The apparatus according to claim 10, wherein the deflector comprises at least one deflection prism.

12. The apparatus according to claim 3, wherein the imaging optics comprise an optical component arranged to receive the monitoring radiation from the area to be monitored and operable to form the first monitoring beam and the at least one additional monitoring beam.

13. The apparatus according to claim 12, wherein the optical component is operable to form the first monitoring beam and the at least one additional monitoring beam at different times.

14. The apparatus according to claim 13, wherein the optical component comprises at least one aperture arranged to form the first monitoring beam and the at least one additional monitoring beam.

15. The apparatus according to claim 3, wherein the imaging optics are arranged to redirect the first monitoring beam and the at least one additional monitoring beam to the image detector to provide at least three images of the area to be monitored.

16. The apparatus according to claim 1, wherein the imaging optics comprise an imaging optical element arranged to derive at least one additional monitoring beam from the center portion of the monitoring radiation, and to redirect the at least one additional monitoring beam to the image detector to provide at least one additional image of the area to be monitored.

17. The apparatus according to claim 16, wherein the programmable evaluation device is operable to compare the at least one additional image obtained from the at least one additional monitoring beam with the at least one image obtained from the first monitoring beam.

18. The apparatus according to claim 1, further comprising a laser processing nozzle having a nozzle opening arranged to allow passage of the high-energy beam to the workpiece, wherein the imaging optics are arranged to receive the monitoring radiation from the nozzle opening.

19. The apparatus according to claim 18, wherein an inner nozzle contour of the laser processing nozzle forms the reference contour.

20. The apparatus according to claim 1, wherein the image detector comprises a camera.

21. The apparatus according to claim 3, wherein the programmable evaluation device is operable to determine a distance between the reference contour and an upper side of the workpiece based on a comparison of the recorded images.

22. The apparatus according to claim 1, further comprising: a mirror arranged to receive the high-energy beam; and a controller unit coupled to the mirror, wherein the controller unit is operable to alter the focus position of the high energy beam by adjusting a position of the mirror.

23. The apparatus according to claim 1, further comprising: means for changing a focal point of the imaging optics.

24. A method for determining a focus position of a high-energy beam along a propagating direction of the high-energy beam relative to a workpiece or relative to a reference contour of the apparatus, the method comprising:
receiving, at imaging optics comprising at least one lens, monitoring radiation from an area of the workpiece, of the reference contour, or of both the workpiece and the reference contour to be monitored, the monitoring radiation passing through a focusing lens arranged to focus the high-energy beam on the workpiece;

deriving a first monitoring beam from a first outer portion of the monitoring radiation that is non-coaxial with and excludes a center portion of the monitoring radiation;

redirecting the first monitoring beam with the imaging optics to an image sensitive surface of an image detector;

generating, by the detector, at least one image of the area to be monitored responsive to the first monitoring beam being incident on the image sensitive surface of the image detector; and determining the focus position of the high-energy beam from the at least one image.

25. The method according to claim 24, wherein the focus position is determined based on a position of the reference contour in the at least one image.

26. The method according to claim 24, further comprising:

deriving, at the imaging optics, at least one additional monitoring beam from a third portion of the monitoring radiation;

redirecting the at least one additional monitoring beam with the imaging optics to the image sensitive surface of the image detector;

generating at least two images of the area to be monitored based on the first monitoring beam and the at least one additional monitoring beam, wherein determining the focus position of the high-energy beam is based on a comparison of the at least two images.

* * * * *